United States Patent [19]

Berg

[11] 4,286,684

[45] Sep. 1, 1981

[54] HYDRAULIC SERVO STEERING SYSTEM

[75] Inventor: Lawrance F. Berg, Lockport, Ill.

[73] Assignee: Caterpillar Tractor Co., Peoria, Ill.

[21] Appl. No.: 189,958

[22] PCT Filed: Mar. 3, 1980

[86] PCT No.: PCT/US80/00228

§ 371 Date: Mar. 3, 1980

§ 102(e) Date: Mar. 3, 1980

[51] Int. Cl.³ .............................................. B62D 5/08
[52] U.S. Cl. .................................... 180/133; 60/384; 180/139
[58] Field of Search ............... 180/132, 133, 134, 136, 180/137, 138, 139; 60/384, 403; 91/6

[56] References Cited

U.S. PATENT DOCUMENTS

| | | | |
|---|---|---|---|
| 2,521,652 | 9/1950 | Rockwell | 180/134 |
| 2,917,125 | 12/1959 | Donner | 180/139 |
| 3,016,708 | 1/1962 | Gordon et al. | 60/384 |
| 3,189,119 | 6/1965 | Moreno et al. | 180/153 |
| 3,326,317 | 6/1967 | Marquardt | 180/139 |
| 3,468,126 | 9/1969 | Mercier | 60/384 |
| 3,991,846 | 11/1976 | Chichester et al. | 180/132 |
| 4,253,540 | 3/1981 | Berg | 180/139 |

*Primary Examiner*—John A. Pekar
*Attorney, Agent, or Firm*—John W. Grant

[57] ABSTRACT

A hydraulic servo steering system (10) for vehicles has a steering valve (24) for directing fluid to steering cylinders (16,17) in response to pilot fluid directed to one end of the steering valve (24) from a hand metering unit (31). A servo cylinder (19) directs a volume of fluid to the other end of the steering valve (24) sufficient for returning the steering valve (24) to its centered position in response to turning of the vehicle. A pair of pilot operated check valves (53,54) positioned in the lines (51,52) between the servo cylinder (19) and the steering valve (24) are opened in response to fluid pressure being established in the lines (51,52) by a means (71). Should one of the lines (51,52) rupture, the resultant drop in fluid pressure in the lines (51,52) causes the check valves (53,54) to close thereby isolating the steering valve (24) from the ruptured lines (51,52). Thereafter the steering valve (24) can be operated in a "jerk steer" manner for emergency steering of the vehicle.

4 Claims, 3 Drawing Figures

HYDRAULIC SERVO STEERING SYSTEM

DESCRIPTION

1. Technical Field

This invention relates generally to a steering system and more particularly to a hydraulic servo steering system having a pair of pilot operated valves which permit the steering system to be operated as "jerk" steering in the event of a line failure in the servo circuit.

2. Background Art

Many hydraulic steering systems have a pilot operated steering valve for controlling the flow of pressurized fluid from a pump to one or more steering cylinders in response to pilot fluid directed thereto from a hand metering unit. With such systems, rotation of the steering wheel one revolution, for example, directs a preselected volume of pilot fluid to one end of the steering valve to shift it a preselected distance. A servo circuit is sometimes included as an integral part of such steering systems for causing the steering valve to return to its centered position in response to turning of the vehicle so that one turn of the steering wheel will provide a proportionate degree of turning of the vehicle. The servo circuit has a followup servo mechanism connected between a pair of members which move relative to one another upon the vehicle being turned. The followup servo mechanism can be either a linear or rotary motor with its opposite ends or sides being in fluid communication with the opposite ends of the steering valve for directing a volume of fluid substantially equal to the preselected volume of fluid directed to the one end of the steering valve by the hand metering unit to the opposite end of the steering valve thereby returning the steering valve to the center position. This hydraulically locks the steering cylinders in the steering position determined by the degree of rotation of the steering wheel. One example of a hydraulic servo steering system is disclosed in U.S. Pat. No. 3,326,317 to J. F. Marquardt on June 20, 1967.

One of the problems associated with such servo systems, particularly on large earthmoving vehicles, is that the lines of the servo system are relatively small and occasionally must be positioned at locations where they are somewhat vulnerable to damage. Should one of the lines be broken, the steering function would be lost completely since no pilot pressure could be generated at either end of the steering valve.

The present invention is directed to overcoming one or more of the problems as set forth above.

DISCLOSURE OF THE INVENTION

In one aspect of the present invention a hydraulic steering system having a pilot operated steering valve, a hand metering unit connected to opposite ends of the steering valve, a followup servo cylinder, and a pair of lines connecting opposite ends of the servo cylinder to opposite ends of the steering valve includes a pair of pilot operated valves individually positioned within the pair of lines. Each of the pilot operated valves is movable between a closed position at which fluid flow therethrough is blocked and an open position at which fluid can communicate between the servo cylinder and the ends of the control valve. Each of the pilot operated valves is movable to the open position in response to the fluid pressure in the pair of lines exceeding a preselected level and to the closed position in response to the fluid pressure in the lines between the pilot operated valves and the servo cylinder being less than the preselected level. A means is provided for establishing fluid pressure in the pair of lines above the preselected pressure level.

The problem of maintaining a steering function in the event of a rupture in one of the lines connecting the servo cylinder to the steering valve is overcome by placing a pilot operated check valve in each line at a location sufficient for isolating the steering valve from the line should a failure occur in the line. The pilot operated check valve is opened in response to fluid pressure exceeding a preselected pressure level being established in the lines between the check valves and the servo cylinder to permit normal operation of the steering system and is closed when the fluid pressure in the lines drops below the preselected level. Thus, should a failure occur in one of the lines, the check valves isolate the steering valve from the failure so that the steering valve can be operated sufficiently to obtain "jerk" steering of the vehicle.

BEST MODE FOR CARRYING OUT THE INVENTION

Figure 1:
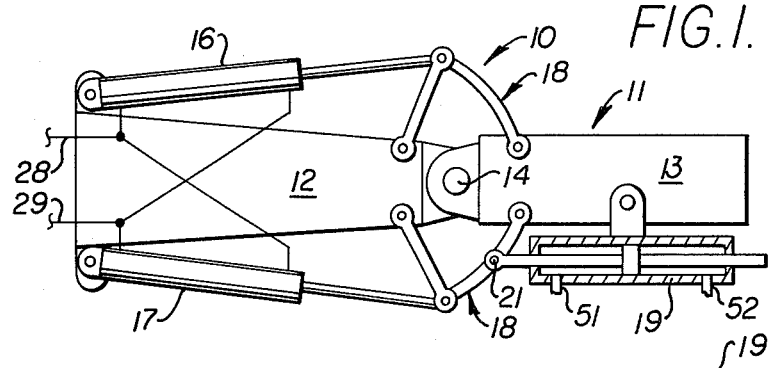
FIG. 1 is a diagrammatic view of an embodiment of the present invention.

Referring now to the drawing, and particularly FIG. 1, components of a hydraulic servo steering system 10 is connected to a vehicle partially shown at 11. The vehicle has first and second members 12,13 pivotally movable relative to one another about a pivot 14. The steering system 10 includes first and second steering cylinders 16,17 having their head ends pivotally attached to the first member and their rod ends attached to the second member 13 through linkages 18 in the usual manner. A followup servo cylinder 19 is pivotally connected to the second member 13 and has its rod end pivotally attached at 21 to one of the linkages 18. Although the servo cylinder 19 is shown as a linear motor, alternatively, the servo cylinder can be a rotary motor suitably connected to the first and second members 12,13.

Figure 2:
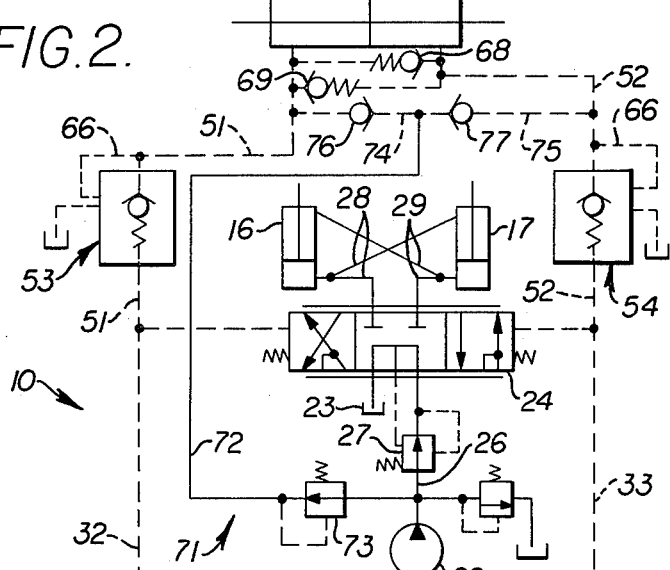
FIG. 2 is a schematic view of the hydraulic system of the present invention.

Referring now to FIG. 2 the steering system 10 includes a pump 22 which draws fluid from a reservoir 23 and is connected to a pilot operated steering valve 24 through a conduit 26 and a flow control valve 27. The steering valve 24 is connected to the steering cylinders 16,17 through a pair of conduits 28,29 and is movable between first, second and third positions. At the first position fluid directed thereto from the pump 22 is directed to the steering cylinders 16,17 through conduit 28 while fluid exhausted from the cylinders through conduit 29 is returned to the reservoir 23. At the second position the fluid from pump 22 is directed through conduit 29 to the steering cylinders 16,17 while the fluid exhausted from the cylinders through conduit 28 is returned to the reservoir 23. At the third position the steering valve 24 blocks fluid flow between the cylinders 16,17, the reservoir 23 and the pump 22 while fluid flow from the pump 22 passes through the steering valve 24 and back to the reservoir 23.

The steering valve 24 is movable between its respective positions in response to input signals in the form of pilot fluid from a hand metering unit 31 through pilot lines 32,33. A suitable hand metering unit 31 is, for example, a Char-Lynn Model W manufactured by the Fluid Power Division of Eaton Corporation of Eden Prairie, Minn., and disclosed in U.S. Pat. No. 3,991,846 to Willard L. Chichester et al issued Nov. 16, 1976. The components of the hand metering unit 31 are shown schematically within the broken line and includes an orbiting metering pump 34 driven in either direction by rotation of a steering wheel 35 through a mechanical linkage 36 which connects the metering pump 34 to a metering spool type valve 37. The metering spool type valve 37 is connected to the metering pump 34 by passages 38,39 and is spring loaded to the open centered position as shown. The valve 37 is movable between first and second positions by the mechanical linkage 36 according to the rotational direction of the steering wheel 35 and metering pump 34. At the first position of valve 37 pilot fluid from the metering pump 34 is directed through the passage 38 and a passage 43 to line 32 and hence the left end of the steering valve 24 while the fluid exhausted from the right end of the steering valve 24 is returned through line 33, a passage 44, a makeup valve 46 and passage 39. At the second position of valve 37, fluid from the metering pump 34 is directed through passages 39 and 44 to line 33 and hence the right end of the steering valve 24 while the fluid exhausted from the left end of the steering valve 24 is returned through line 32, passage 43, makeup valve 46 and passage 38. A return port 47 is connected to the reservoir 23 through a pressure responsive valve 48.

A pair of lines 51,52 are connected to the lines 32,33, respectively, and hence the opposite ends of the steering valve 24, and to the opposite ends of the servo cylinder 19. A pair of pilot operated valves 53,54 are individually positioned within the lines 51,52. Each of the pilot operated valves is movable between a closed position at which fluid flow therethrough is blocked and an open position at which fluid can communicate between the servo cylinder 19 and the steering valve 24. Each of the pilot operated valves 53,54 is moved to the open position in response to fluid pressure in the lines 51,52 reaching a preselected pressure level and to the closed position in response to the fluid pressure in the lines 51,52 between the pilot operated valves 53,54 and the servo cylinder 19 being less than the preselected pressure level. In the present embodiment, the preselected pressure level is about 175 kPa (25.5 psi).

Preferably, the valves 53,54 should be located as close as possible to the steering valve 24 and in some cases may actually be incorporated within the same valve body.

Figure 3:
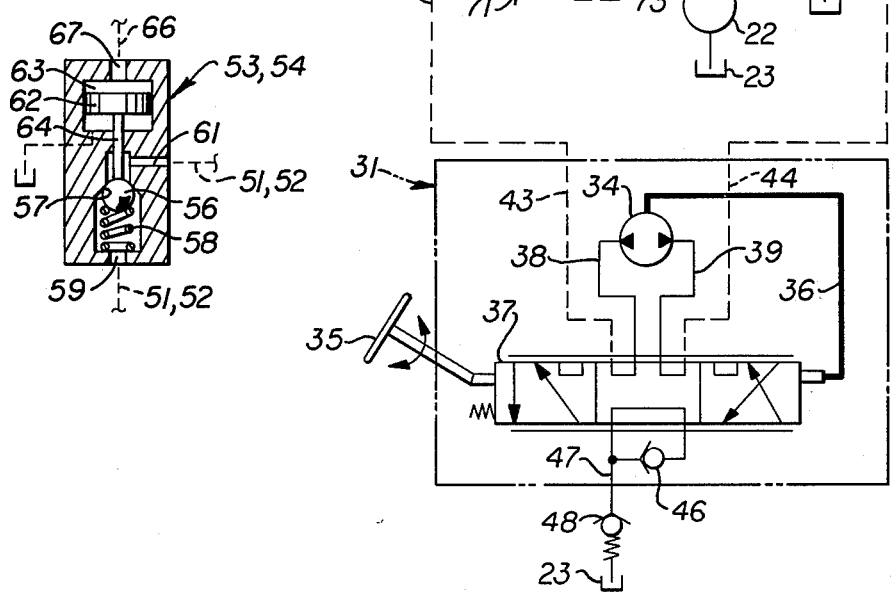
FIG. 3 is a cross sectional view of a representative pilot operated check valve.

Preferably each of the pilot operated valves 53,54 is a pilot operated check valve. One such pilot operated check valve is diagrammatically illustrated in FIG. 3 and has a ball 56 normally urged against a valve seat 57 by a spring 58 to block communication between a pair of ports 59,61. A power piston 62 is slidably positioned within a chamber 63 and has a stem 64 adapted for engagement with the ball 56. A branch line 66 connects the servo cylinder side of line 51 or 52 to the chamber 63 through a port 67.

Alternatively, the pilot operated valves 53,54 can be pilot actuated spool valves in which the spool is urged to the closed position by a spring at one end of the spool and moved to an open position by fluid pressure directed to the opposite end of the spool in response to fluid pressure in the servo cylinder side of line 51 or 52.

A pair of cross over valves 68,69 interconnects the servo cylinder side of lines 51,52.

A means 71 is provided for establishing a fluid pressure in lines 51,52 above the preselected level with the means being connected to the lines 51,52 between the pilot operated valves 53,54 and the servo cylinder 19. The means 71 can include, for example, a line 72 connected to conduit 26, a pressure reducing valve 73 positioned within line 72, a pair of branch lines 74,75 connecting the line 72 to the lines 51,52 respectively and a pair of check valves 76,77 positioned within the branch lines 74,75. In the present embodiment, the pressure level established by the means 71 is about 350 kPa (51 psi) with the pressure responsive valve 48 opening when the pressure level in the return port 47 exceeds about 380 kPa (55 psi).

INDUSTRIAL APPLICABILITY

During normal operation of the servo steering system 10 the pump 22 supplies a source of pressurized fluid thereto. The pressure reducing valve 73, line 72, check valves 76,77, and lines 74,75 establish and maintain a fluid pressure in the lines 51,52 above the preselected pressure level for example, 350 kPa. The work area of the power piston 62, the effective area of the ball 56 and the force of the spring 58 are selected so that the power piston 62 unseats the ball 56 when the pressure in the lines 51,52 exceeds about 175 kPa. Thus during normal operation when the fluid pressure in lines 51,52 is maintained at about 350 kPa, the pilot operated valves 53,54 are held in the open position for normal operation of the servo system. However, if one of the lines 51,52 should rupture the resulting pressure drop in the lines 51,52 would cause the pilot operated valves 53,54 to close thereby blocking communication of fluid from the opposite ends of the steering valve 24 to the servo cylinder 19. With the pilot operated valves 53,54 in the closed position, the steering control valve 24 could still be shifted in either direction by proper rotation of the steering wheel 36 to obtain "jerk" steering capabilities of the steering system for controlling the vehicle.

Other aspects, objects and advantages of this invention can be obtained from a study of the drawings, the disclosure and the appended claims.

What is claimed is:

1. In a hydraulic steering system (10) having a pilot operated steering valve (24), a hand metering unit (31) in fluid communication with opposite ends of the steering valve (24), a followup servo cylinder (19), a pair of lines (51,52) connecting opposite ends of the servo cylinder (19) to opposite ends of the steering valve (24), the improvement comprising:

a pair of pilot operated valves (53,54) individually positioned within the pair of lines (51,52) each being movable between a closed position at which fluid flow therethrough is blocked and an open position at which fluid can communicate between the servo cylinder (19) and the opposite ends of the steering valve (24), each of the pilot operated valves (53,54) being moved to the open position in response to fluid pressure in the pair of lines (51,52) reaching a preselected level and to the closed position in response to the fluid pressure in the lines (51,52) between the pilot operated valves (53,54) and the opposite ends of the servo cylinder being (19) less than the preselected level, and means (71) for establishing fluid pressure in the pair of lines (51,52) above the preselected level, said means (71) being connected to the lines (51,52) at a location between the pilot operated valves (53,54) and the servo cylinder (19).

2. The hydraulic steering system (10) of claim 1 wherein the pilot operated valves (53,54) are pilot operated check valves.

3. The hydraulic steering system (10) of claim 2 including a pair of cross over valves (68,69) interconnecting the pair of lines (51,52) at a location between the pilot operated valves (53,54) and the servo cylinder (19).

4. The hydraulic steering system (10) of claim 3 including a pump (22) connected to the steering valve (24), and wherein said means (71) for establishing the preselected pressure level includes a pressure reducing valve (73) in fluid communication with the pump (22) and being connected to the first and second lines (51,52).

* * * * *